United States Patent [19]

Schaeffer

[11] Patent Number: 5,579,585

[45] Date of Patent: Dec. 3, 1996

[54] FREE AXIS ALIGNMENT APPARATUS AND METHOD FOR USE

[76] Inventor: Michael Schaeffer, Rte. 2, Box 177-A, Atlanta, Tex. 75551

[21] Appl. No.: 323,935

[22] Filed: Oct. 17, 1994

[51] Int. Cl.⁶ .............................. G01C 15/06; G01B 11/26
[52] U.S. Cl. .................................. 33/295; 33/293; 33/286
[58] Field of Search ........................ 33/295, 286, 287, 33/293, 283, 290, 533, 645, 529

[56] References Cited

U.S. PATENT DOCUMENTS

| | | |
|---|---|---|
| 685,455 | 10/1901 | Kinkead . |
| 1,134,125 | 4/1915 | Hafner . |
| 1,428,669 | 9/1922 | Watson ............................... 33/295 |
| 2,840,913 | 7/1958 | Houser ............................... 33/295 |
| 3,604,121 | 9/1971 | Hull . |
| 3,852,888 | 12/1974 | Seifert ............................... 33/286 |
| 4,319,406 | 3/1982 | Pehrson, Sr. et al. ............... 33/295 |
| 4,338,725 | 7/1982 | Martin et al. ...................... 33/529 |
| 4,480,390 | 11/1984 | Frissora ............................. 33/286 |
| 4,580,345 | 4/1986 | Andrew ............................. 33/529 |
| 4,747,454 | 5/1988 | Perryman .......................... 33/286 |
| 4,803,784 | 2/1989 | Miller ............................... 33/293 |

*Primary Examiner*—Christopher W. Fulton
*Attorney, Agent, or Firm*—Ronald B. Sefrna; Charles W. Alworth

[57] ABSTRACT

An apparatus that projects the horizontal and vertical axis of an object to be aligned for ready sighting by survey instruments is disclosed. The device consists of a v-frame with a rotatable head to which a target platform for mounting a vertical or horizontal scale may be affixed. The v-frame is held on the object and moved about the object until the surveyor can see the target scale without having to remove ancillary equipment that would ordinarily obscure the target. Standard surveying methods may then be used to align the object.

22 Claims, 16 Drawing Sheets

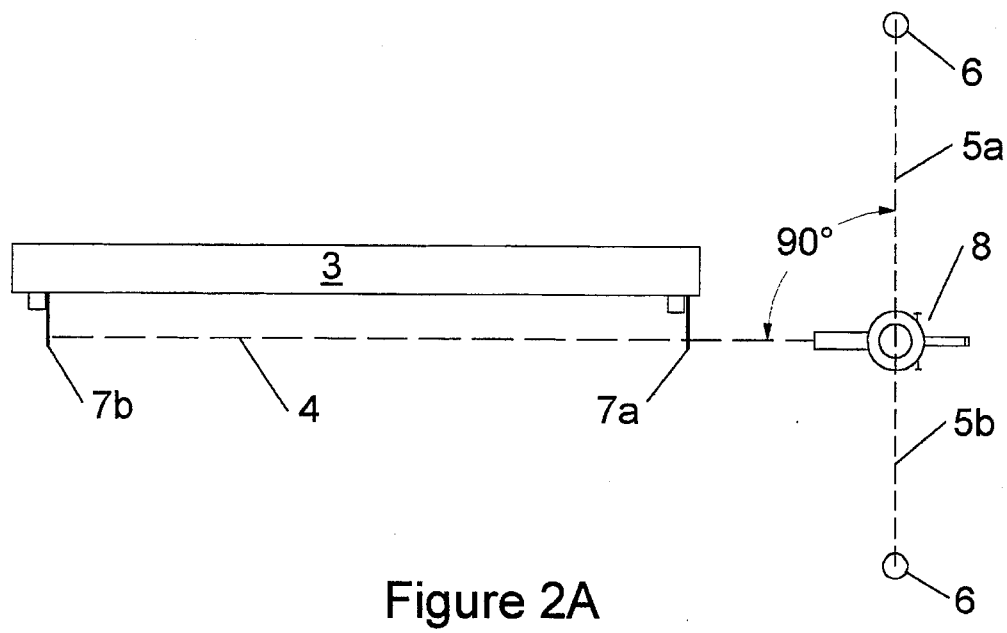
Figure 2A
(Prior Art)
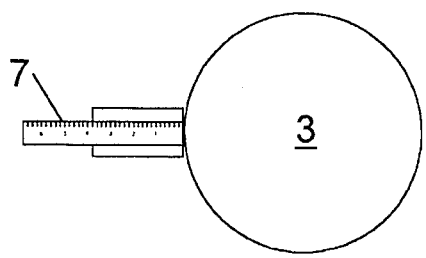
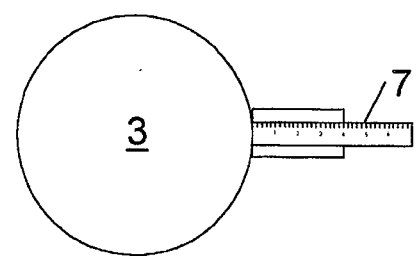
Figure 2B
(Prior Art)
Figure 2C
(Prior Art)

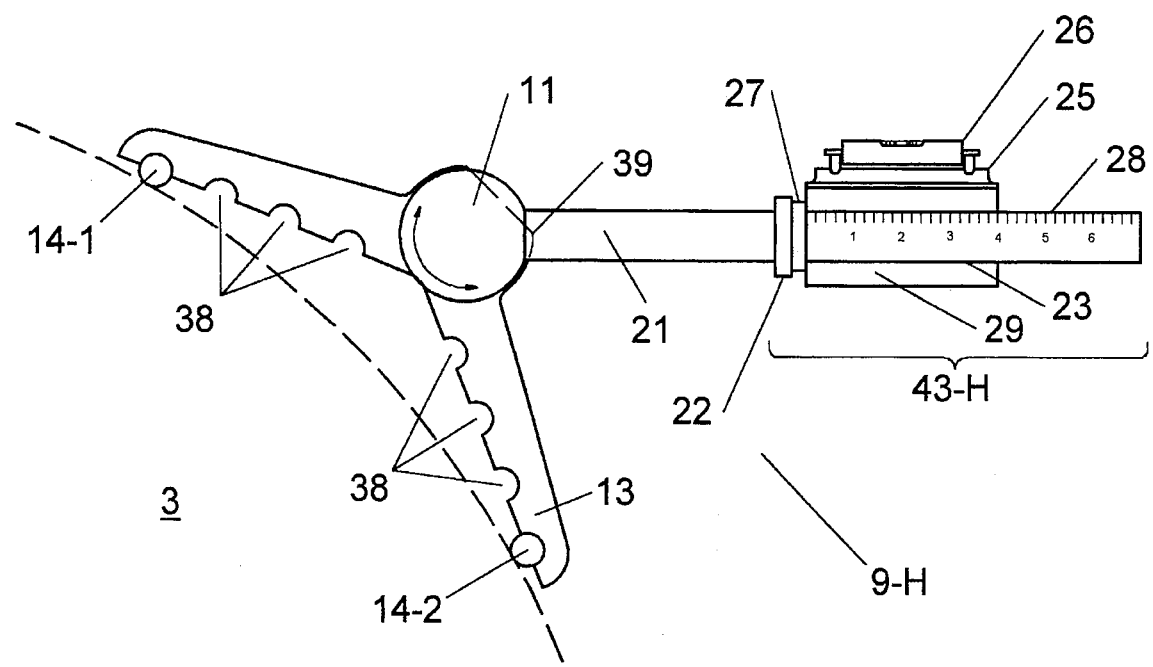
Figure 3-A

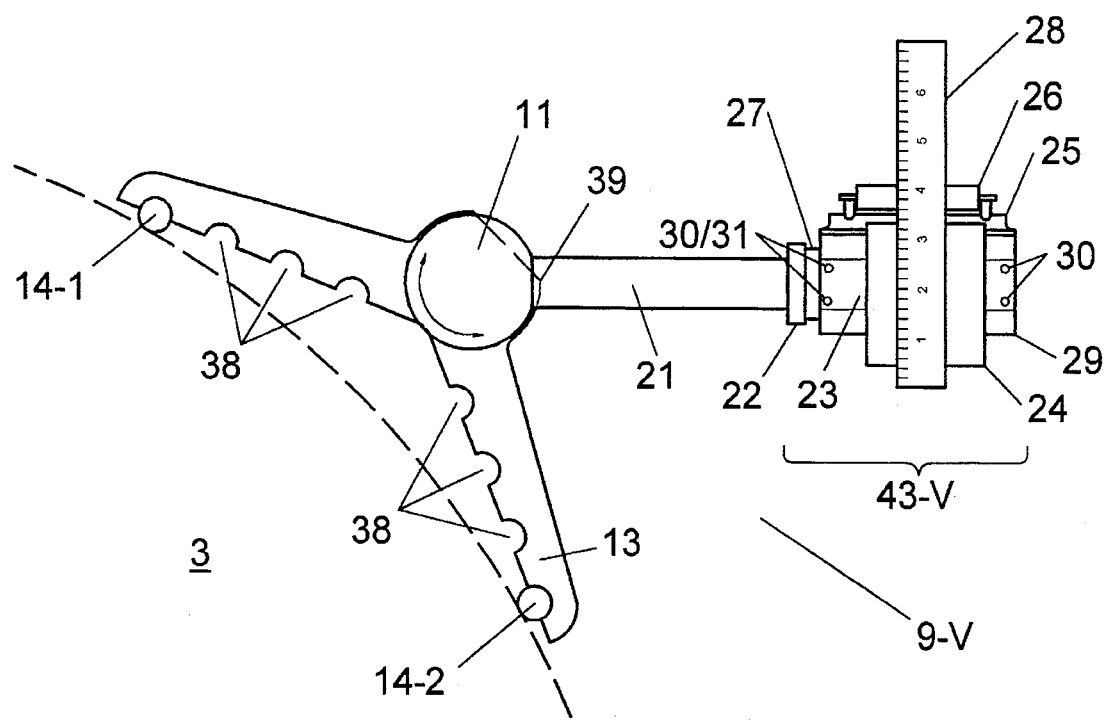
Figure 3-B

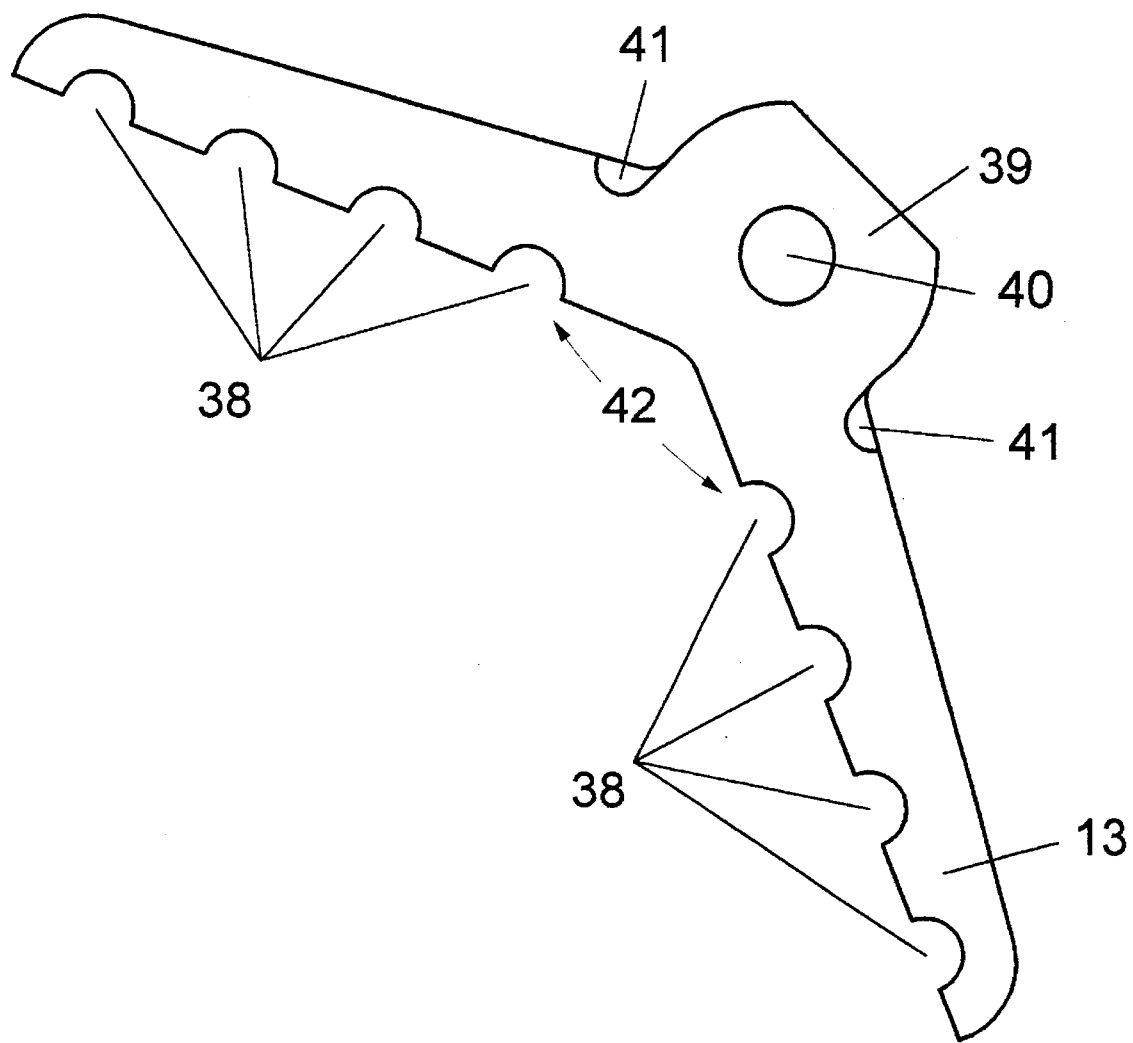
Figure 4-A

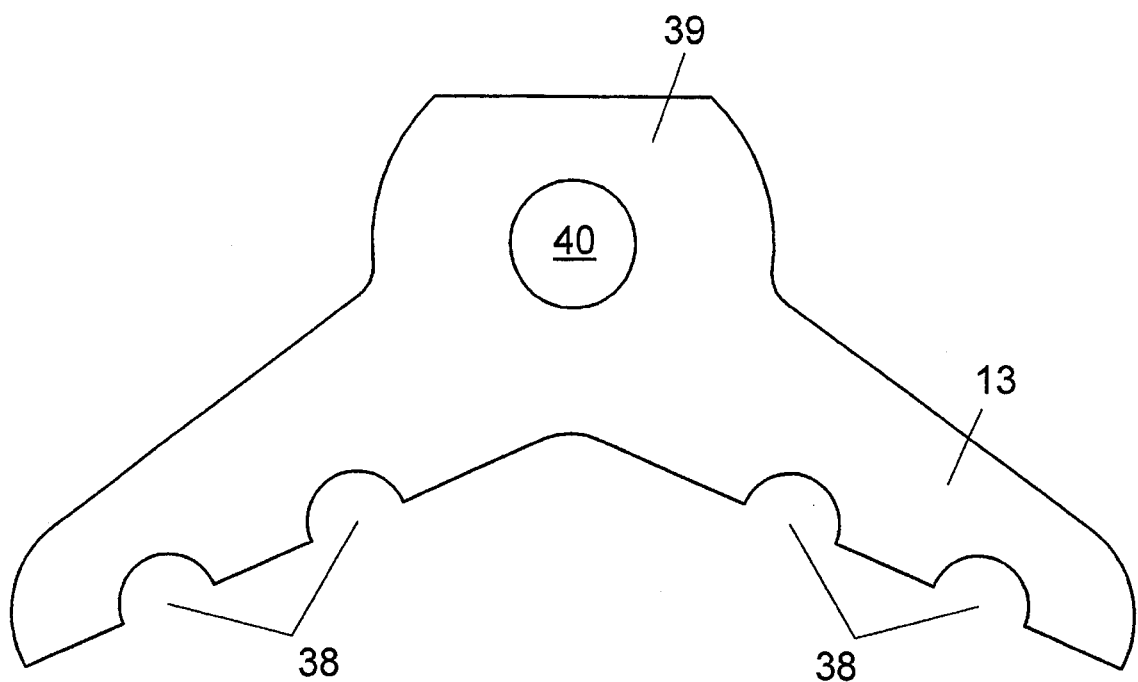
Figure 4-B

FREE AXIS ALIGNMENT APPARATUS AND METHOD FOR USE

TECHNICAL FIELD OF THE INVENTION

The invention relates to an apparatus and method for aligning selected objects with respect to a given point and more specifically relates to alignment of rollers in a roll mill with respect to both vertical and horizontal.

BACKGROUND OF THE INVENTION

Rollers are used in many industries for flattening and shaping sheets of various materials. The process of drawing steel or similar materials into flat sheets or rolls requires that the material be run through a series of rollers. Similarly the process for making paper requires that the product be run through a series of rollers. The industry refers to this series of rollers as a "roll mill". The roll mill process is also used to form pipe, wire, and other similar products.

A roll mill consists of a series of pairs (or sets) of parallel rollers generally having a top and bottom roller. These rollers are mounted on movable bearings in such a manner that each roller may be raised or lowered and so that each roller may be moved in a transverse horizontal plane. Each of the rollers in a pair must be aligned in the vertical and horizontal transverse planes with each other and each of the roller pairs must be precisely parallel to each other throughout the sheet path. If there is any mis-alignment, then the formed product will be thicker at one edge or the product will be forced to one side of the roll mill.

Each roll mill will have a different set of requirements. For example, in a (sheet or plate) steel roll mill, each set of rollers must be precisely aligned and all of the rollers must be centered at the same elevation. In order to vary the thickness of the product, the separation of each roller pair is varied. This change in separation is accomplished by adjusting the roller bearing mounts which requires precise alignment after the separation distance is varied. In a paper roll mill, product changes rarely occur and the center of the roller sets do not have to be at the same elevation. However, alignment in the vertical and horizontal planes and parallelism between sets of rollers is still very critical. Roll mill rollers become worn, bearings become damaged, and myriad other maintenance problems will occur in a roll mill, requiring that rollers be removed, repaired and etc. Each time a roller is maintained or moved, then that roller must be aligned.

Roller pairs (or even a single roller) are generally aligned by placing a target (a sighting scale) at both ends of the roller and in contact with the roller. The positioning of the target is critical and the present art requires that the target be placed in a precise horizontal direction whenever the roller is being checked for horizontal alignment and then in a precise vertical direction whenever the roller is being checked for vertical alignment. The placement techniques are well established, but require that optical alignment equipment be able to see (or sight) the target. This often requires that other equipment must be removed from the roll mill. Very often other rollers must be removed which requires that those removed rollers be re-aligned after they are replaced. This makes for a long involved process which can introduce additional mis-alignment problems.

Alignment of rollers is undertaken by taking a sight on the roller target with precision optical equipment and recording the difference in scale readings between the two ends. It should be noted that classical optical techniques or precision laser optical techniques can be used to take such a "sight". The difference in the two readings is the total amount of mis-alignment. Adjustments will then be made and the roller target re-sighted. This process is repeated for the other axis. The process of sighting and adjustment is repeated until the alignment is within tolerance.

A similar process is used to align large rotating equipment such as steam turbines and electric power generators. A sight is taken on the turbine shaft and a sight is taken on the generator shaft. The two pieces of equipment are moved until the shafts are precisely aligned at which time mechanical attachment of the two shafts is made. Shaft and roller alignment techniques are well known in the prior art and the prior art has a long history.

PRIOR ART

U.S. Pat. No. 685,455 to Kinkead (1901) discloses an instrument for hanging and lining up shafting. This device uses optical techniques and targets to align a shaft (a single roller) in the vertical direction. The disclosure could easily be expanded to include horizontal alignment if a slightly different mounting system were employed. The disclosure requires that the targets and optical sighting equipment hang from the shaft to be aligned and that a sight line is available. This disclosure requires that equipment which could block the sight line be removed and the disclosure requires precise vertical (or horizontal) placement of the targets.

U.S. Pat. No. 1,134,125 to Haftmr (1915) is an improvement to the Kinkead apparatus and is applied to the apparatus for attaching the Kinkead targets to the shaft to be aligned. This improvement discusses only the vertical alignment, but its techniques could readily be modified to apply to the horizontal direction.

U.S. Pat. No. 3,604,121 to Hull (1971) discloses a roll alignment method and apparatus. This device uses a gyro-controlled sighting target which is placed on the roll or rollers to be aligned. The device is designed to work on a continuous web processing system which has a plurality of rollers not necessarily arranged in roller pairs. The device does not appear to be able to function with roller pairs unless the upper roller can be moved sufficiently far from the lower roller while alignment of the lower roller is undertaken.

U.S. Pat. No. 3,852,888 to Seifert (1974) discloses a roll level checking device and is designed to check the output of a roll mill by measuring the slope of a slab as it is ejected from the roll mill. This device would find use in a metal mill where roller speeds are slow, but would be very limited in a paper roll mill where the speeds are extremely high. In the case of a paper roll mill, the quantity of "out-of-specification" product would be high and this device would be of limited value.

U.S. Pat. No. 4,319,406 to Pehrson et al. (1982) discloses laser targets for roller alignment and takes the form of a series of target devices which clamp directly to the rollers which are to be aligned. The device is the natural extension to Kinkead (1901) in concept in that the targets clamp to the rollers and provide for both horizontal and vertical alignment after removing any equipment that would block the sight line.

U.S. Pat. No. 4,480,390 to Frissora Anthony P. et al. (1984) discloses an apparatus and method for aligning an object with respect to top-dead center of a wheel. This is a platform device which sits on a wheel (or as a natural extension —a roller) to provide a target for alignment of a second device with the axis of a wheel (or roller). It does not provide for alignment of the wheel in the vertical or horizontal.

All the known prior art being used with roll mills requires that the target be attached to the roller and mounted in the horizontal plane to measure horizontal alignment or in the vertical plane to measure vertical alignment. The targets must be set at each end of the roller and the targets must be visible from a precision sighting device while in set position. In a complex paper roller mill, the roller pairs are on different planes and often interfere with each other as far as line of sight is concerned. Thus, when using the prior art to align complex roller mills, it is often necessary to remove rollers and other ancillary equipment to be able to sight the roller or roller pair to be aligned. This means that previously aligned and operating rollers (or roller pairs) must be removed and then re-aligned. These extra steps increase the chance for error, increase the maintenance costs and certainly affect downtime.

The prior art apparatus and methods of use cause a great deal of downtime with corresponding high costs of maintenance mainly because ancillary equipment and rollers must be removed often. It is an object of this invention to provide a tool (or target) and method whereby precise horizontal and vertical sighting of the roller (or roller pair) to be aligned is not a requirement for precision alignment of rollers (or roller pairs) in any roll mill; thus, reducing the cost of maintenance, the cost of downtime, and the chance for error.

SUMMARY OF THE INVENTION

The instant invention consists of three major parts, or assemblies, which further contain a series of subassemblies. The first part, the alignment tool (or target) has two arms which together form a v-frame (the frame). The second part is a rotatable head attached to the v-frame, and the third part is an extension arm extending from the rotatable head. There is a precision scale mounted to the extension arm and a slidable precision level attached to the precision scale. The precision scale is a natural branch of the extension arm. There are a series of semicircular holes (or notches) along each of the v-frame arms which can receive stabilizing rods. The stabilizing rods extend perpendicular to the v-frame arms, the rotatable head, the extension arm, and the precision scale and level. The choice of which hole or notch in which to place a stabilizing rod depends on the diameter of the roller which is to be aligned. A stabilizing rod on each arm of the frame assures a precise perpendicular relationship between the alignment tool and the roller to be aligned; that is, the frame, when positioned on the roller, will set the precision scale to be perfectly radial (or perpendicular) to the roller. Only one such alignment tool or target and a surveyor sighting instrument (which can be classical or laser) are required to align (or sight) a roller.

To use the target tool, a helper holds the target against the roller and selects the appropriate notches in which to place the stabilizing rods. The helper positions the target on the roller so that the surveyor can see the target and the rotatable head is clamped so that nothing will move. This clamping procedure fixes the relationship between the precision scale and the frame. The helper then moves the scale arm about the rotatable head until the precision level shows "level". With the "scale" in the level horizontal position a sight is taken from the survey instrument and the reading noted. There is no requirement that the target frame be placed on a pure horizontal (or vertical) axis. The movement of the precision scale and the precision level projects the pure horizontal (or vertical) axis of the roller out to a point where the optical survey instrument can "see" the target. Thus, no ancillary equipment needs to be removed.

The helper carries the alignment tool to the other end of the roller without changing any mechanical setting on the tool. The helper positions the stabilizing rods in their respective notches and positions the tool on the roller. The alignment tool is radially moved about the roller until the precision level shows "level". This procedure places the tool in the same relative position on the second end of the roller that it occupied on the first end assuming that the roller is consistent across its surface from one end to the other. It should be noted that the prior art makes the same assumption as to consistency across a roller. A sight is taken from the survey instrument and the reading noted. The difference (if any) between the two readings is the total amount of horizontal mis-alignment.

The helper, remaining at the second end of the roller, now removes the scale and replaces it on the target tool in the vertical position without changing any other mechanical setting. This new vertical position is precisely perpendicular to the extension arm of the frame. In a similar manner the tool, with the stabilizing rods in place, is radially moved about the roller until the precision level again shows "level". This places the tool on the roller in exactly the same position as when the second horizontal sight was taken. A "vertical" sight is taken from the survey instrument and the reading noted.

The helper carries the alignment tool to the first end of the roller without changing any mechanical setting on the tool. The helper positions the stabilizing rods in their respective notches and positions the tool on the roller. The alignment tool is radially moved about the roller until the precision level once more shows "level". This procedure places the tool in the same relative position on the roller that it originally occupied. A sight is taken from the survey instrument and the reading noted. The difference (if any) between the two readings is the total amount of vertical mis-alignment.

It should be noted that the alignment target tool does not have to be placed at the exact vertical or exact horizonal axis of the roller which is being aligned. Thus, if a clear sight of the target cannot be obtained at the exact vertical or horizontal axes, then the tool can be positioned on the roller until the line of sight is cleat and a "sight" taken. The precision tool of the instant invention projects the horizontal and vertical roller axes from any convenient position on the roller ends to a point where a clear sight line exists. Thus, the shortcomings of the prior art, namely a perfect sighting on the horizontal and vertical axes of the roller, which often meant removal of other equipment, have been overcome.

The apparatus and method can significantly reduce downtime because ancillary, equipment does not need to be removed to obtain a perfect sight—only the target tool needs to be moved. Because other equipment (or rollers) need not be removed, additional mis-alignment errors will not be introduced and a significant savings in maintenance costs and downtime will result. It should be noted that the technique described for the alignment of rollers can easily be extended to the alignment of shafts and the like.

BRIEF DESCRIPTION OF THE DRAWINGS

FIG. 2A is a top view illustrating the present art for sighting a vertical axis on an object. This view shows the sight being taken on the "front" of the object.

FIG. 2B is an end view illustrating the present art target placed on the "front" of an object.

FIG. 2C is an end view illustrating the present art target placed on the "back" of an object. The sighting technique would be similar to FIG. 1A except the sight is taken along the "back" of the object.

FIG. 3-A is a front view of the present invention showing the frame, rotatable head, precision level and scale in its horizontal mode.

FIG. 3-B is a front view of the present invention showing the frame, rotatable head, vertical adaptor plate, precision level and scale in its vertical mode.

FIG. 4A is a front view of the larger V-frame of the present invention showing the circular block, aperture and series of stabilizer notches.

FIG. 4B is a front view of the smaller V-frame of the present invention showing the circular block and aperture which are the same size as the larger V-frame and a reduced number of stabilizer notches.

DESCRIPTION OF THE PREFERRED EMBODIMENT

In order to understand the invention and its preferred embodiment some background about the prior art methods and apparatus are required. As previously explained, generally the prior art alignment uses a precision scale mounted at the point for which alignment is desired. For example, if a roller is to be aligned, then the point in question will be found at both ends of the roller. On the other hand, if two pieces of rotating equipment are to have their respective shafts aligned for coupling, then the points in question are the face places (or couplers) of each piece of equipment.

Alignment is undertaken in the "x" and "y" or horizontal and vertical direction and the technique used for alignment of a roller (or rollers) will be used as an example to explain alignment. The techniques change slightly between different objects that are to be aligned and those skilled in the art can readily make those changes.

Figure 1A:
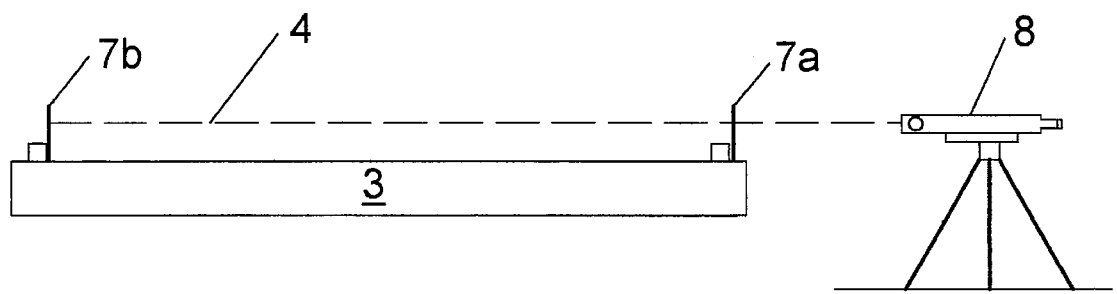
FIG. 1A is a side view illustrating the present art for sighting a vertical axis on an object. This view shows the sight being taken on the "top" of the roller.
Figure 1B:
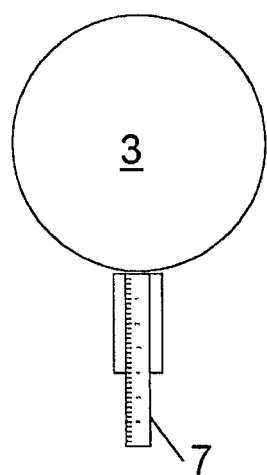
FIG. 1B is an end view illustrating the present art target placed on the "top" of an object.
Figure 1C:
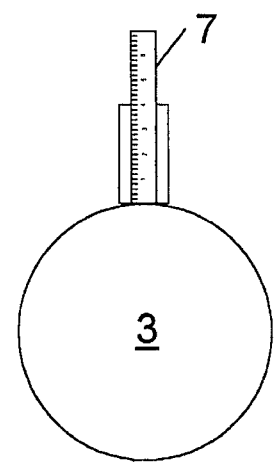
FIG. 1C is an end view illustrating the present art target placed on the "bottom" of an object. The sighting technique would be similar to FIG. 1A except the sight is taken along the "bottom" of the object.

FIGS. 1A through 1C show the general concept behind vertical alignment. In the art a precision scale, 7, is placed at top dead center at one end of the roller to be aligned. A precision optical tool or surveying instrument, 8, then sights the scale in its first position, 7a, along the sighting line, 4, and the reading is noted. The scale is then moved to the other end of the roller, 7b, and positioned at top dead center and another reading from the optical tool is taken. It should be noted that nothing can obstruct the sight line, 4, or interfere with the survey instrument otherwise a reading cannot be obtained. The difference between the two readings is the total amount of vertical mis-alignment. It is possible to use two such precision scales at one time positioned at points 7a and 7b.

In a similar manner, FIGS. 2A through 2C show the general concept behind horizontal alignment. In this version of the art a precision scale, 7, is placed at exactly 90 degrees below top dead center of the roller to be aligned. A precision surveying tool then takes a sight on a bench mark, 6, along the reference line 5a or 5b. Generally the bench mark is associated with the roller mill and assures that the rollers will be perfectly square to the roller mill (and to each other). The survey tool then sights the precision scale at its first position, 7a, and then at its second position 7b using the same concepts as presented in the paragraph above. It should be noted that again nothing can obstruct the reference line, 5, the sight line, 4, or interfere with the survey instrument otherwise a reading cannot be obtained. The difference between the two readings is the total amount of horizontal mis-alignment. As with the vertical measurement, it is possible to use two such precision scales at one time positioned at points 7a and 7b.

Based on the readings taken for both vertical and horizontal mis-alignment, a mechanic would adjust the roller bearings and/or alignment plates. The techniques are well established in the art and anybody with normal skill is capable of making such adjustments. The two axes are re-sighted and the total amount of mis-alignment noted. These steps are repeated until the mis-alignment is eliminated or within tolerance. If any ancillary equipment has been removed, then that equipment is replaced and any necessary alignment procedures would be conducted. As previously explained, the alignment procedure would be simplified if there were a method to project the "x" and "y" out away from the roller (or object in question) so that the "x" and "y" precision scale could readily be sighted.

Figure 14:
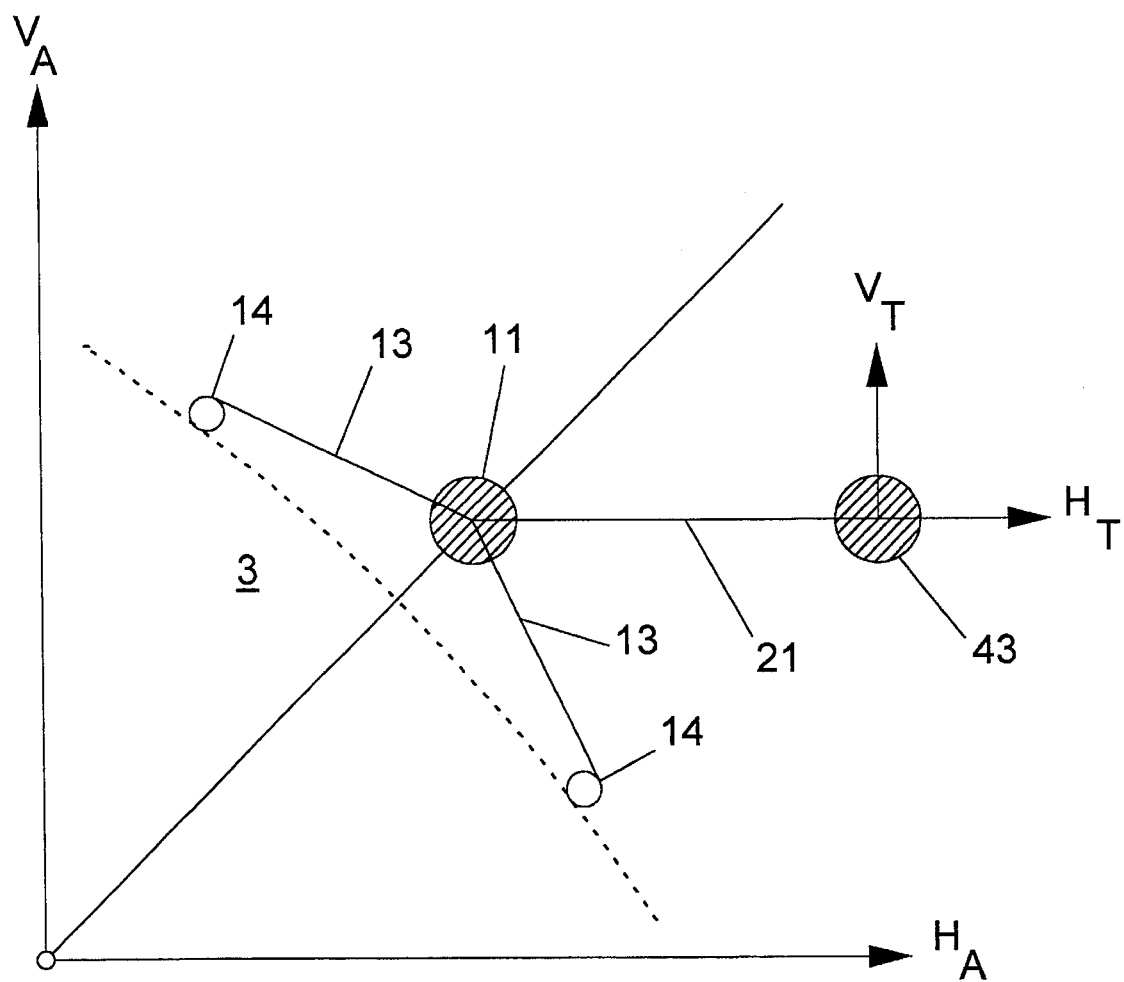
FIG. 14 shows how the instant invention projects the horizontal and vertical axis of the object to be aligned to a point which is visible by the surveyor.

FIG. 14 shows how the instant invention is capable of projecting the axes out to a point in space where ready sighting and alignment can be made. The actual vertical and horizontal axes of the object are shown as $V_A$ and $H_A$. $H_A$ is "level" or parallel to the ground and $V_A$ is at right angles to $H_A$ by definition. The instant invention is shown on the circumference of the object and it will position itself on a radial projection from the center of the object. When the extension arm and target assembly are rotated to cause the precision level in the target assembly to indicate "level", then that arm is parallel to the ground and parallel to $H_A$. Thus the target horizontal axis, $H_T$, is on the same plane as "the" horizontal axis to be aligned. Since, by definition, the vertical axis is at right angles to the horizontal axis, the target vertical axis, $V_T$, is parallel to "the" vertical axis to be aligned. The surveyor now need only base his readings oil the projected axes.

It should be noted that the sighting procedure is somewhat more complicated than that described immediately above because certain errors are always introduced by survey instruments. Those skilled in the art of alignment know that the theodolite used to survey the alignment has its own intrinsic errors and the process of double centering must be used with the instrument in order to cancel its intrinsic errors.

The preferred embodiment of the instant invention may be found in FIGS. 3 through 9. An alternate embodiment may be found in FIGS. 12 and 13 and a series of illustrations showing how the instant invention may be placed on a roller can be found in FIGS. 10 and 11. The instant invention consists of three major parts, or assemblies, which further contain a series of subassemblies.

Starting with the device in its simplest mode, the horizontal mode as illustrated in FIG. 3-H, the first major assembly is the V-frame, 13, and its two associated stabilizing rods 141 and 142. The second major assembly is the rotatable head, 11, and its associated extension arm, 21. The rotatable head consists of several sub-parts and the associated extension arm is available in a number of standard lengths, both of which will be discussed later in greater detail. The extension arm is attached to the third major assembly which contains the horizontal target platform, 29, via a swivel ring, 22, and an associated swivel mount, 27. The horizontal target platform, swivel ring and swivel mount consist of a number sub-assemblies which will also be described later in greater detail.

The V-frame (or frame), 13, shown in detail in FIG. 4A, is manufactured from aluminum and ranges in thickness from ¾-inch to 1-inch depending on the length of the arms. Other suitable light weight materials could readily be employed in its manufacture providing the material is rigid. The V-frame consists of two similar arms with a plurality of semicircular notches, 38, on the lower side of each arm. The preferred embodiment utilizes two sizes of V-frame in which the arms vary in length from about 6 inches long to about 12 inches long. The small frame is manufactured from ¾-inch material, whereas the larger frame is made from 1-inch material. The choice of thickness is really a matter of convenience as the thickness does play a part in the rigidity of the frame. Although only two sizes are described, in the preferred embodiment, larger or smaller flames could be required; thus, this description should not be construed as a limitation on the invention.

The size of the frame is determined by the size of the object that needs to be aligned. For example a two inch roller would use the smallest V-frame, whereas a 48 inch roller would use the larger V-frame. Since the V-flame is to be placed perpendicular to the object (roller) which is to be aligned, a scheme is needed to assure that the V-frame is perpendicular. The stabilizing rods, 141 and 142, accomplish this purpose. The user would select the appropriate notch in which to place the stabilizing rods; this choice is determined by the object size. The rods, 14, are held in place by Allen head bolts, 20, which thread into a threaded aperture, 19, located in each of the notches, 38. The bolts fit within a counter sunk hole so that the bolts do not interfere with its associated stabilizing rod.

The stabilizing rods, 14, come in several lengths varying from about three inches long to 8 inches long. The proper length is determined by the size of the V-frame selected for the size of the roller to be aligned. That is, the larger the V-frame, the longer the rod. The key to rod selection is the stability required for the measurement; the V-frame must remain fixed on the object during the time that a "sight" is being taken. It should be noted that in order to increase parts compatibility and interchangeability, the diameter of the stabilizing arms, 14, and the diameter of the stabilizing notches, 38, are the same for all the V-frames.

The V-frame arms meet at the center of the V at the frame circular block, 39, forming an obtuse angle, 42, as shown in FIG. 4A. The frame circular block contains an aperture, 40. The best value of this angle is about 140 degrees; but, this is not critical because the choice of angle need only assure that a V-frame will fit on a reasonable range of object diameters. If the angle is too large, then the V-frame will only fit large diameter objects; if the angle is too small, then the V-frame will only fit small diameter objects. The best combination of arm length and V-flame thickness has been determined and is given in the table below. It should be noted that this table should not be construed to be a limitation on the device but is given only to illustrate a reasonable and proper combination of design parameters. For example, if a 180 inch roller needs alignment, then a larger frame could be required.

| TABLE OF V-FRAME PARAMETERS | | | |
| --- | --- | --- | --- |
| Type | Thickness | Arm Length | Object Diameter Range |
| I | ¾ inch | 3" | 2"–12" |
| II | 1 inch | 6" | 12"–120" |

| TABLE OF STABILIZER ROD PARAMETERS | | | |
| --- | --- | --- | --- |
| Type | Diameter | Length | Used on V-frame Type |
| A | ½ inch | 3" | I only |
| B | ½ inch | 8" | I or II |

The aperture, 40, allows for passage of the Allen head clamping bolt, 15, which also serves to join the rotatable head, 11, to the frame. The size of the frame's circular block, 39, and the aperture, 40, is the same for all V-frames. This standardization of sizes means that the same rotatable head, 11, extension arm, 21, and target assembly, 43-H or 43-V can be used with different frame sizes on different object diameters. On either side of the frame aperture, 40, there are two indentations, 41. These indentations allow the swivel ring, 22, to rotate whenever the target assembly is used without an extension arm. The indentations would not be necessary if the face of the V-frame were raised; however, the indentations are easier and simpler to machine.

Figure 5:
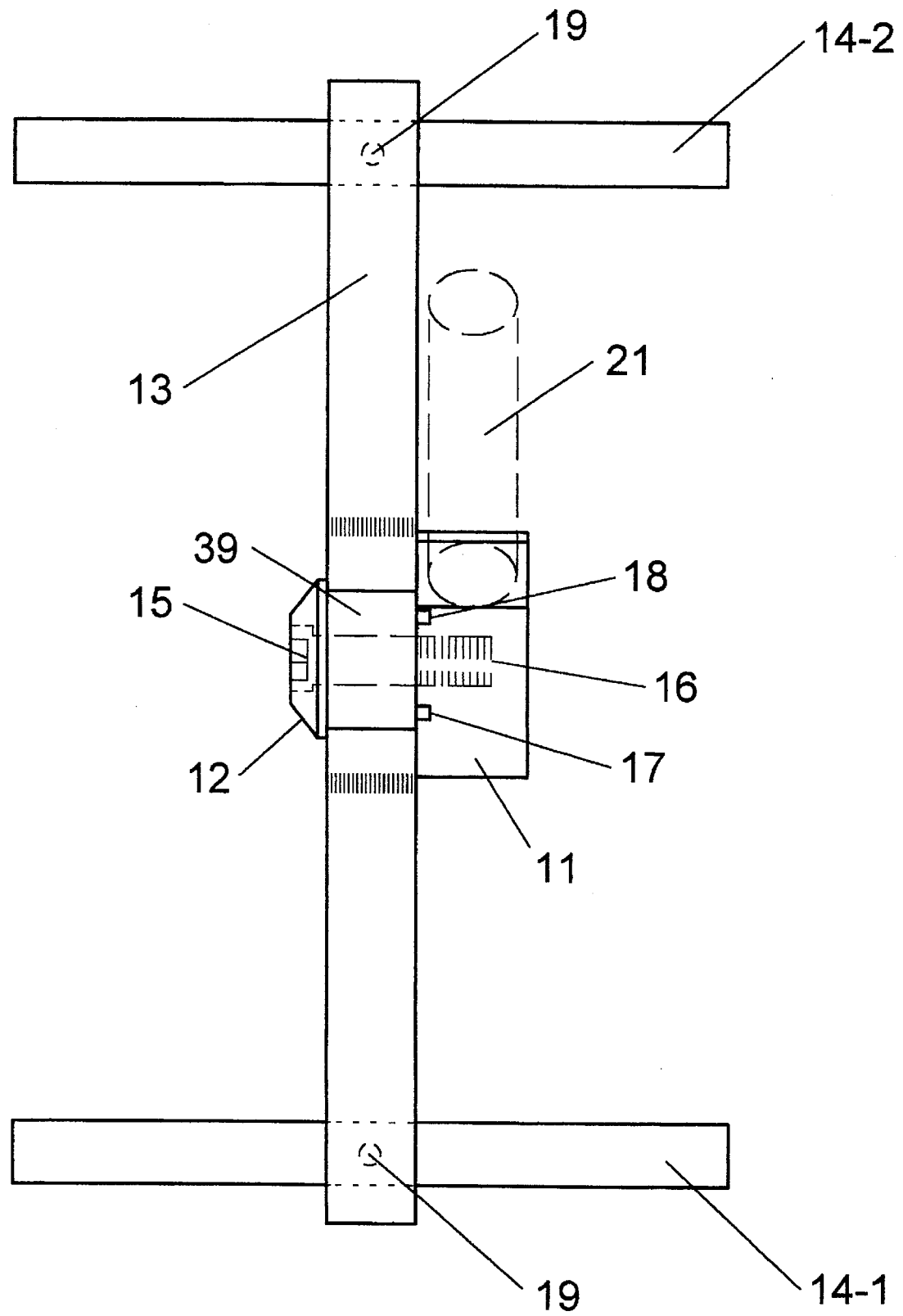
FIG. 5 is a top view of the present invention shown in FIG. 3H or 3V further illustrating the two extension rods projecting from the frame notches. The dotted line shows the position of the variable length extension arm.
Figure 6A:
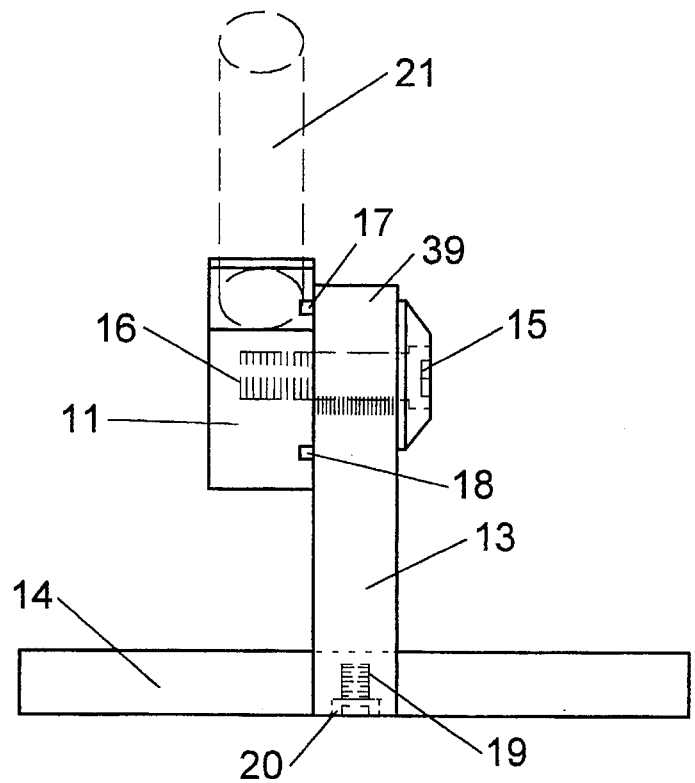
FIG. 6A is a side view of the present invention shown in FIG. 3.
Figure 6B:
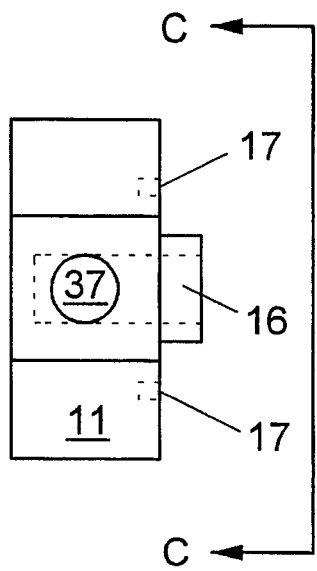
FIG. 6B is a side view of the rotatable head used in the present invention and giving details oil the apertures within that head.
Figure 6C:
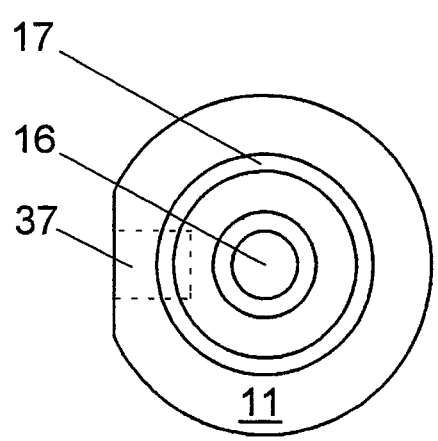
FIG. 6C is an end view of the rotatable head of FIG. 6B taken along C—C.
Figure 7:
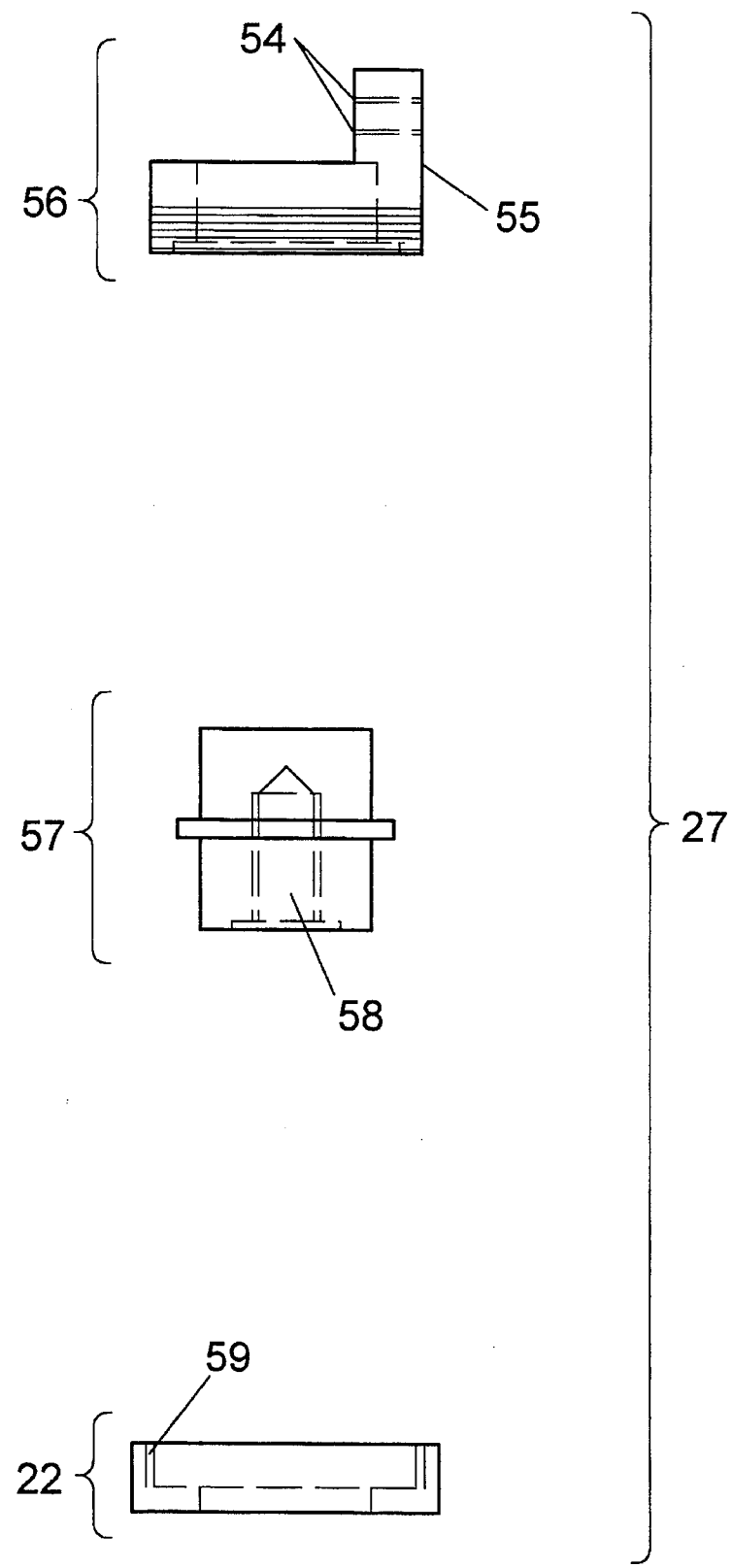
FIG. 7 is an exploded cross-sectional view of the swivel mount giving details of the three parts that go together to form the overall mount.

The rotatable head, 11, is slightly larger than the frame circular block, 39, and has a first threaded aperture, 37, (FIG. 6B or 6C) which accepts the extension arm, 21, as shown in FIGS. 3, 5, and 6. In order to assure a proper fit between the extension arm and the rotatable head, the circular head has a "flat" located about the threaded aperture. It is possible to attach the target directly to the rotatable head without using an intermediate extension arm. The extension arm is attached to the rotatable head using an all-thread (⅜-NF) which threads into the aperture, 37, and which then threads into a similar threaded aperture on the extension arm. The extension arm is a standard commercial item and will be discussed later; thus, the size of the ⅜-NF threaded aperture is set by this commercial extension arm.

The rotatable head also contains a second threaded aperture, 16, which accepts the Allen head clamping bolt, 15. The Allen head clamping bolt passes through an opening (not numbered) in the guide ring, 12, through the frame aperture, 40, and into the second threaded aperture, 16. This Allen bolt seines to hold the rotatable head to the V-frame and to clamp the rotatable head in a given position when and if the Allen bolt is fully tightened. The guide ring, 12, serves literally as a guide for the Allen bolt, 15, and has a countersunk opening that accepts the cap head on the Allen bolt. It would be possible to do away with the guide ring but the Allen cap would then rub against the aluminum V-flame circular block and scar the same. This scaring would eventually reduce the precision of the instrument and allow wobble between the rotatable head and the V-flame to occur.

As the reader will find, it is important that the rotatable head, 11, be capable of being firmly clamped to the V-frame once a position of the head has been selected. It is imperative that the two parts not rotate during the time that the device is being used to make a measurement. In order to assure that the clamping action is permanent, an O'ring, 18, and O'ring groove, 17, are placed in the rotatable head. It would be possible to place the same in the V-flame but the better choice is to have them in the head. When the Allen bolt is loosened, the head will freely and smoothly rotate about the V-frame circular block; however, when the Allen bolt is tightened the circular block presses against the O'ring and the friction between the O'ring, its groove and the circular block become very high. This simple concept assures that the rotatable head will remain fixed as long as the Allen bolt is tight.

The extension arm is a standard survey instrument called a "Scale Extension". This device is used to make precision length measurements and is manufactured from a proprietary alloy such as Invar™ and is available from the Brunson Corporation under the tradename of "Invar Scale Extension." This material has a very low coefficient of expansion and its length will not perceptibly change while a "sight" is being taken. This could be important when a horizontal sight is taken on a long roller where each end of the roller must lie in the same plane. If the extension arm varied in length during the "sight", then error could be introduced. In a similar manner a variation in the V-frame due to temperature could affect the "sight". Note that the obtuse angle and offset arms tend to cancel out dimensional variations introduced by temperature. Looking carefully at FIG. 3-H, if the upper arm (holding stabilizer 141) increases in length, then the rotatable head will move away from the roller and down. But, the lower arm (holding stabilizer 142) will grow at the same rate as the upper arm which will :force the rotatable head upwards and towards the roller. These changes will cancel each other and dimensional variations induced by temperature in the preferred aluminum V-frame are minimized. If this becomes a problem, then the V-flame can be made of a light weight alloy which has a low coefficient of expansion.

These standardized Invar Scale Extensions are threaded at both ends. Each end has a female ⅜-inch National Fine (⅜-NF) thread that mates with a standard ⅜-inch all-thread. Thus, a series of these bars can be threaded together to obtain varying lengths; however, this approach is not preferred. The rotatable head accepts the all-thread placed in one end of the scale extension. A specially designed swivel mount and locking ring assembly, 22 and 27, available commercially from the Brunson Corporation, is threaded to fit the ⅜-inch all-thread that extends from the Invar Extension Scale. (See FIG. 7) As explained above, it is possible to fit the swivel mount and locking ring assembly directly into the rotatable head as the threads are the same.

The final portion of the instant invention to consider is the target assembly (generally item 43-V, illustrated in FIG. 3-V) which is attached to the swivel mount assembly, 27. In turn the swivel mount assembly is normally affixed to an extension arm coming from the rotatable head as explained above. In the horizontal mode, the target assembly consists of a swivel mount assembly, generally 27, a locking ring, 22, a horizontal platform, 29, and a precision scale, 28. A level platform, 25, is attached to the horizontal platform and serves as the mounting platform for a precision level, 26. In the vertical mode, a vertical adaptor plate, 24, is added to the horizontal platform which functions to rotate the precision scale, 28, by ninety degrees to the vertical position.

The horizontal platform, generally item 29, is shown in greater detail in FIGS. 8A through 8D. This platform consists essentially of an L-shaped piece of machined aluminum, although any light material could be utilized. The platform has a scale/adaptor groove, 23, running across its face. At either end of this groove there are a set of mounting holes, 30. These holes serve to contain a set of bolts (or similar fastener) which attach the platform to the swivel mount, 27. It is sometimes necessary to reverse the position of the horizontal platform on its swivel mount and these mounting holes serve that purpose. The reasons for such reversal will be discussed later.

The scale/adaptor groove, 23, is precision machined in the platform so that the backside of the groove is planar and perpendicular to the plane on which the precision level is mounted. (See FIG. 8B for the location of the precision level, 26, and its mounting platform, 25) The level and its mounting platform are attached to the horizontal platform by fasteners through holes, 44, located on the "L". The scale/adaptor groove has a platform groove lip, 53, formed in the lower section of the groove, 23. This lip has an associated platform lip angle, 48. A precision scale, 28, (or the vertical adaptor plate, 24) readily slides into the groove and is held (or clamped) in place by a precision clamp, 33. This clamp has a clamp lip, 35, with an associated clamp lip angle, 49. The lip angles are chosen to be a 45-degree dove tail in order to hold the scale securely in position.

Figure 8D:
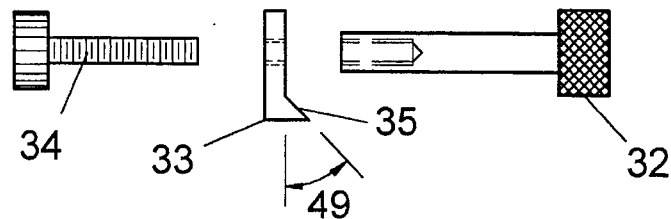
FIG. 8D shows details of the scale/adaptor clamp which is used on the Horizontal Platform and the Vertical Adaptor Platform.
Figure 8B:
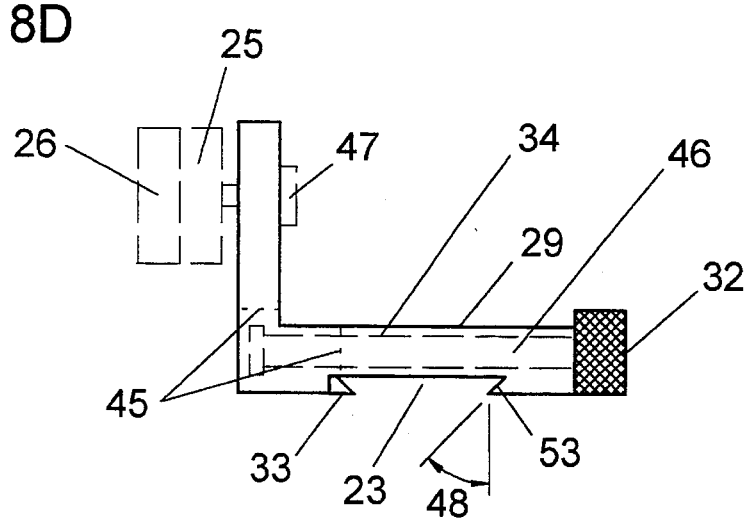
FIG. 8B is an end view of the Horizontal Platform shown in FIG. 8A. This figure shows the location of the precision level and its associated mounting platform on the Horizontal Platform.
Figure 8C:
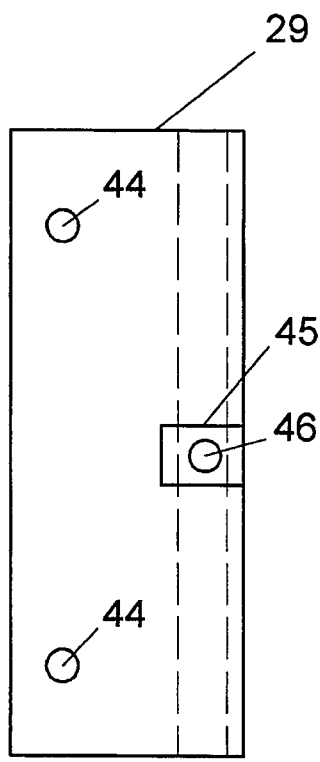
FIG. 8C is a top view of the Horizontal Platform shown in FIG. 8A.
Figure 8A:
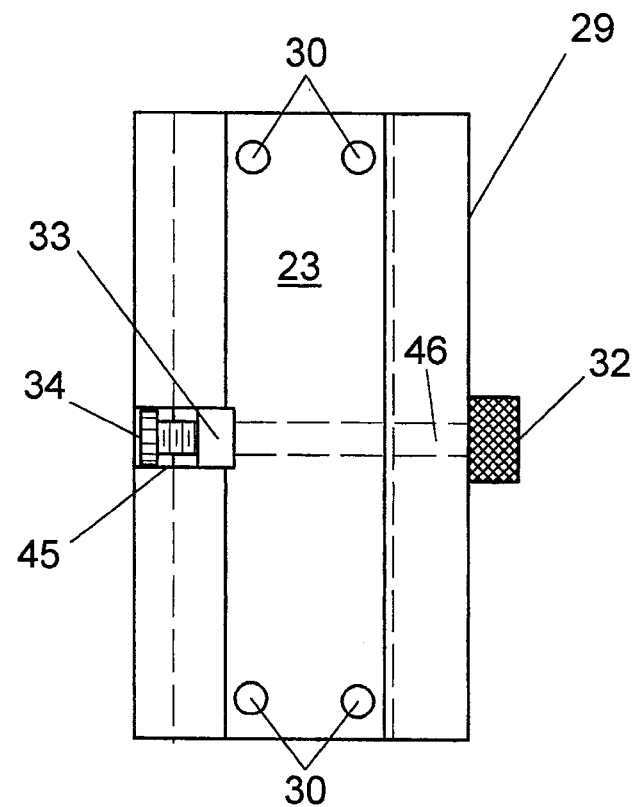
FIG. 8A is a side view of the Horizontal Platform, showing the scale/adaptor clamp in place.
Figure 9D:
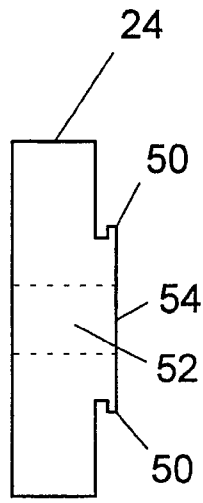
FIG. 9D is an end view of the Vertical Adaptor Platform shown in FIG. 9A taken from its left end.
Figure 9C:
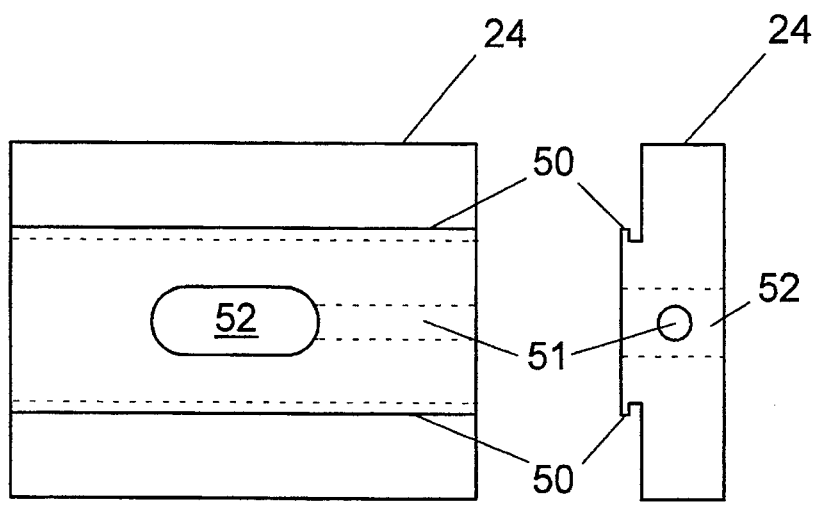
FIG. 9C is a rear side view of the Vertical Adaptor Platform, without the scale clamp in place.
Figure 9E:
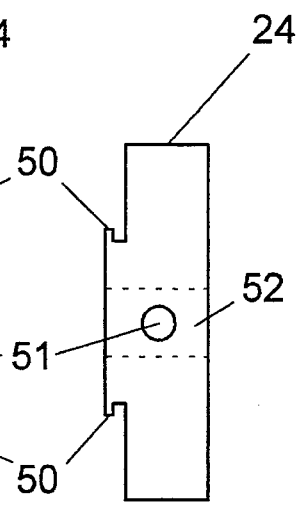
FIG. 9E is an end view of the Vertical Adaptor Platform shown in FIG. 9A taken from its right end showing the aperture for the Knurled Knob associated with the scale clamp.
Figure 9B:
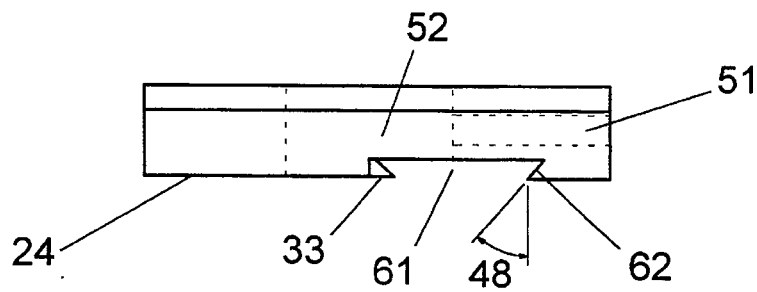
FIG. 9B is a top view of the Vertical Adaptor Platform shown in FIG. 9A.
Figure 9A:
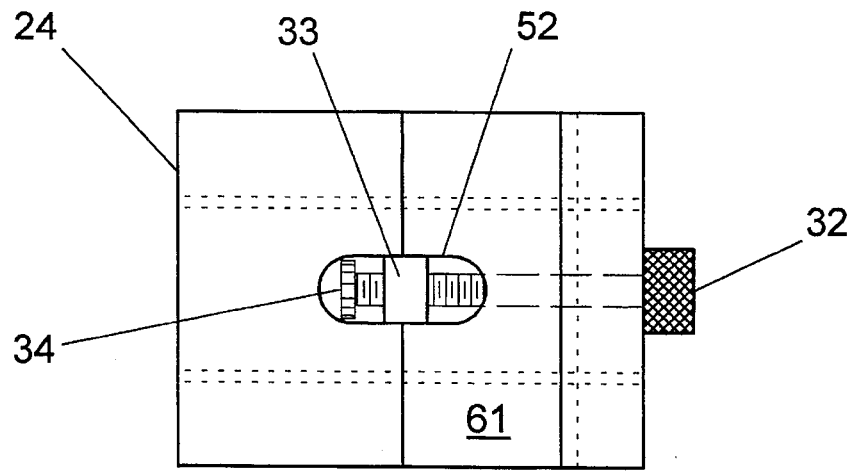
FIG. 9A is a front side view of the Vertical Adaptor Platform, showing the scale clamp in place.

The clamping system consists of three parts as shown in FIG. 8D. These parts are the jack screw, 34; the clamp, 33; and the knurled knob, 32. The clamp has matching threads within an opening in the clamp, as does the knurled knob, that match the jack screw threads. The entire clamp mechanism is assembled within the clamp slot, 45, and the jack screw internally bonded to the knurled knob. The knob and jack screw are free to turn within their respective apertures (45 and 46) within the platform and the clamp is free to move up and down within the clamp slot, 45. The position of the clamp is controlled by the knurled knob.

In the horizontal mode a precision scale is placed in the groove, 23, and the clamp tightened down on the scale. Because both the groove lip and the clamp lip are angled, the precision scale is forced back against the backside of the groove which ensures that the precision scale is perpendicular to the level and solidly held within the groove. In a similar manner, when the device is used in the vertical mode, the vertical adaptor plate, 24, can be clamped within this groove in such a manner that it is perpendicular to the groove and the level as well as being solidly held in place.

The vertical adaptor plate, 24, is shown in greater detail in FIGS. 9A through 9E. The function of this plate is very simple. It is designed to precisely rotate the precision sighting scale from its horizontal position within the instant invention to a vertical position. The rotation must be 90 degrees—no more—no less. If this exact rotation does not occur, then the equipment will be misaligned. This plate functions in a similar way as the horizontal platform in its manner of holding the precision scale.

The plate has a groove, 61, with an associated lip, 62, located on the front of the plate. In a similar manner there is a clamp mechanism consisting of the same three identical parts used with the horizontal groove. The clamp head, 33, passes through the clamp oval, 52, and the jack screw and knurled knob pass through an associated aperture, 51. Whenever the precision scale, 28, is placed in the groove and the clamp tightened, the scale is forced into proper alignment with the back of the groove in the manner described above.

The back of the adaptor plate has a groove and lip arrangement, 50, which is designed to perfectly mesh with groove 23, on platform. This groove and lip arrangement is precisely machined to be at right angles to the precision scale groove on the front of the adaptor plate. In addition the back section, 54, of the groove and lip arrangement is parallel to the back of the precision scale groove. Thus, when the precision scale is clamped in the vertical adaptor groove, it will be both perpendicular to the groove and lip arrangement and parallel to the back thereof. In addition, when the vertical adaptor plate is clamped within the horizontal platform groove, all planes properly align with each other. This means that the precision scale, now within the groove on the vertical adaptor plate will be perpendicular to the precision scale and perfectly parallel to the back of the horizontal groove.

It is imperative to maintain these perpendicular and parallel relationships of the precision scale when it is in its horizontal position and when it is in its vertical position. Moreover, these positions must repeat. Thus the target assembly (generally item 43) is a high precision assembly; if this were not so, then the object could not be aligned properly.

The precision level, 26, and its associated level platform, 25, are relatively simple pieces of equipment. The level is a standard survey instrument and a four inch precision level is preferred. It is possible to use larger sizes but there is no real increase ill accuracy. The level platform is simply a rectangular piece of material mounted to the horizontal platform and serves to facilitate the attachment of the precision level to the horizontal platform. It would seem possible to mount the precision level directly to the platform but experience has shown otherwise. Standard and well known techniques are used to ensure that the precision level is parallel to groove 23.

Use of the device is relatively straight forward and the vertical mode will be described first. The techniques are similar to the present state of the art as shown in FIGS. 1 and 2 described earlier; however, the instant device generally allows alignment to be made without the "line of sight" problems. Normally two people are required to proceed with the alignment, although in unusual circumstances three people may be required. Unusual circumstances would be poor light, where a third person is required to hold a portable light so that the level bubble and the scale can be seen, or where long sighting distances are required and there is a communication problem. Since standard techniques are used for sighting these two or three people requirements are well understood in the art and the description will be given for two workers.

Figure 10:
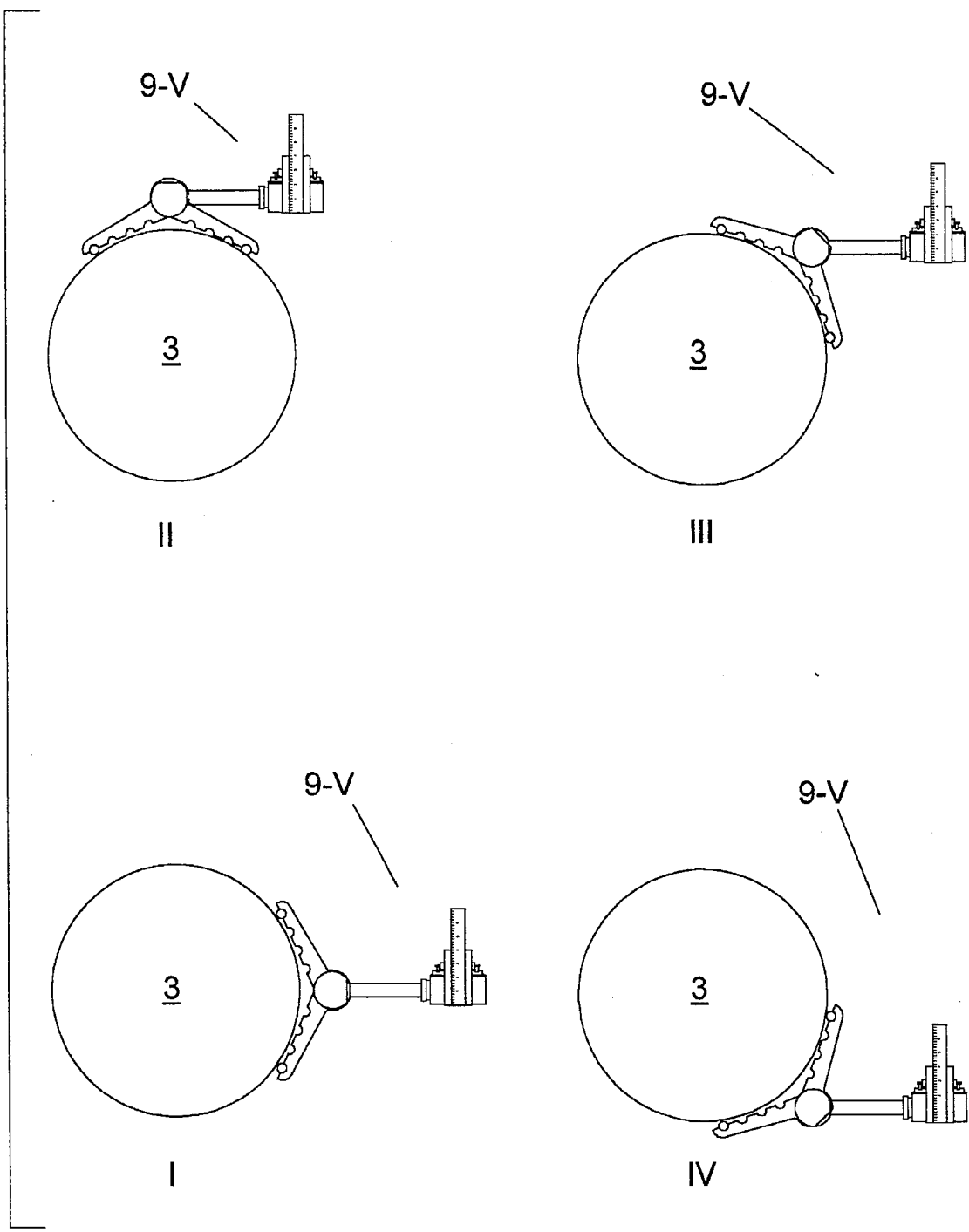
FIGS. 10 (I–IV) shows four positions of an infinite number of positions for the instant invention used in the vertical mode.

The target tool must first be set to vertical mode. This is done by placing the vertical adaptor plate within the horizontal groove and tightening the groove clamp. The precision scale is then placed in groove 61 and the clamp tightened. The proper sized V-frame is chosen as well as the proper sized stabilizer rods. The instant device is then assembled, that is, the rods are bolted into the appropriate notches oil the V-frame and the rotatable head, extension rod, and target assembly loosely attached to the V-frame. The helper positions the V-frame on the roller so that the surveyor can see the scale. The proper choice of extension arm, 21, should be made to assure visibility of the target. A series of possible choices for V-frame positions is shown in FIG. 10.

The helper then looks at the precision level and rotates the rotatable head up or down until the precision level indicates that the target is level. It may also be necessary to adjust the swivel mount assembly, 27, and associated locking ring, 22, to bring the precision level to an upright position. This is done while holding the V-frame on the roller (or object being aligned). The helper will make certain that the "sight" can still be made and then tightens the clamping bolt, 15, in order to fix the relationship of the target head to the V-frame. A vertical shot is now taken by the surveyor. It should be noted that the vertical shot includes the necessary procedures well known by practitioners of the art to remove or reduce theodolite error and Will not be discussed.

There is no requirement that the target frame be placed in the pure vertical axis. The relative position of the precision scale, the V-frame, and the precision level projects the pure vertical axis of the roller out to a point where the optical survey instrument can "sight" the target. Thus, no (or little) ancillary equipment needs to be removed.

The helper carries the alignment tool to the other end of the roller without changing any mechanical setting on the tool. The alignment tool is radially moved about the roller until the precision level shows "level". This procedure places the tool in the same relative position oil the second end of the roller that it occupied on the first end assuming that the roller is consistent across its surface from one end to the other. A sight is taken from the survey instrument and the reading noted. Again, it should be noted that the vertical sight includes the necessary procedures well known by practitioners of the art to remove or reduce theodolite error and will not be discussed. The difference (if any) between the two readings is the total amount of vertical mis-alignment.

The helper, remaining at the second end of the roller, now carefully removes the scale, 28, and the vertical adaptor plate, 24, from the target assembly without disturbing the relative position of the rotatable head. The precision scale is then clamped in the groove, 23, on the horizontal platform, 29. Note, if the relative position is disturbed there is no cause for alarm as the device need only be restored to an approximate relative position, placed on the object to be aligned, and "sighting" verified with the surveyor. In other words the only loss is time; not precision.

Figure 11:
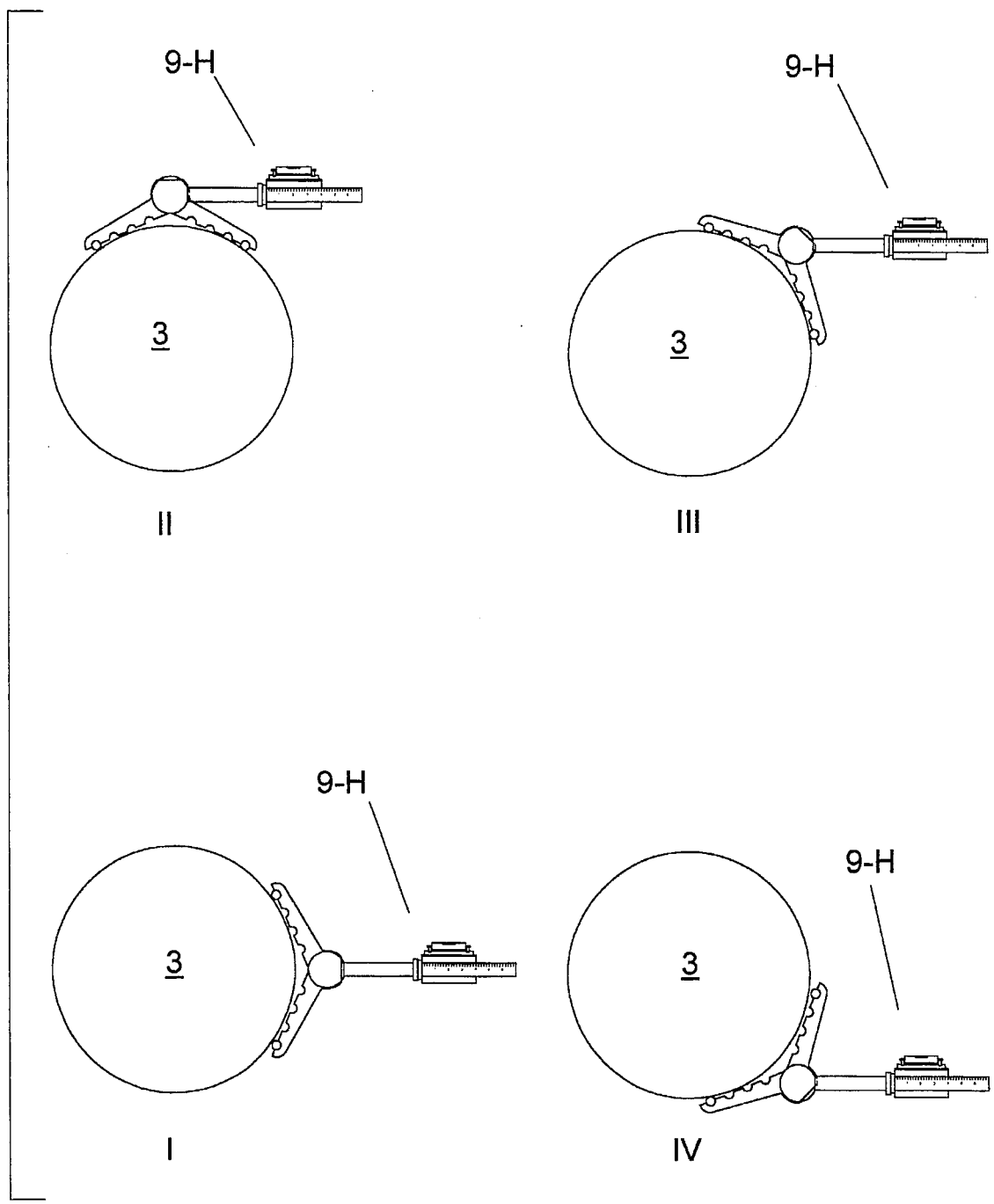
FIGS. 11 (I–IV) shows four positions of an infinite number of positions for the instant invention used in the horizontal mode.

The helper now places the V-frame back on the object in roughly the same position that it occupied while making the vertical measurement and radially moves it about the roller until the precision level again shows "level". A comparable series of possible choices for V-frame positions is shown in FIG. 11. This places the tool on the roller in exactly the same position as when the second vertical sight was taken. A horizontal sight is taken from the survey instrument and the reading noted. (If the relative position of the rotatable head had been disturbed, then the target tool will not be in precisely the same position. As stated, this will not cause any change in alignment precision.) It should be noted that the horizontal shot includes the necessary procedures well known by practitioners of the art to remove or reduce theodolite error and will not be discussed.

The helper carries the alignment tool to the first end of the roller without changing any mechanical setting on the tool. The alignment tool is radially moved about the roller until the precision level once more shows "level". This procedure places the tool in the same relative position on the roller that it originally occupied, providing that the relative position of the rotatable head has not been changed. A sight is taken from the survey instrument and the reading noted. Again, it should be noted that the horizontal sight includes the necessary procedures well known by practitioners of the art to remove or reduce theodolite error and will not be discussed. The difference (if any) between the two readings is the total amount of horizontal mis-alignment.

A report of the value of mis-alignment would be given to the site mechanics who would then make the necessary adjustments to the roller bearings (or other alignment means) to correct the mis-alignment. The above procedures would be repeated, a report made, corrections made, etcetera until the object is within alignment tolerance.

In order to make scale sighting easier, the horizontal platform has two sets of mounting holes, 30, located at either end of the platform. As stated earlier, these holes are used to attach the horizontal platform to the swivel mount bracket, 27. These two pairs of holes allow the scale to be rotated 180 degrees about the vertical axis. Referring briefly to FIGS. 1 or 2, which show the prior art, allow that the "target, 7" is the instant invention 1.0 and that the line of sight, 4, shown coming from the theodolite, 8, and running to the left is blocked by a piece of ancillary equipment. Allow that a clear line of sight is available if the theodolite, 8, is moved to the left side of the figure and that the sight is taken from left to right. Unfortunately the precision scale, 28, of the instant invention, will be hidden by either/or the horizontal platform/vertical platform; however, if the horizontal platform is rotated by 180 degrees (switched end for end on the swivel mounting assembly, 27), then the precision scale, 28, can readily be seen.

These pairs of holes, 30, are precision machined so that a sight can be taken on the top of a roller from one side and a similar sight can be taken on the bottom of a roller from the opposite side without affecting any alignment angles. In a similar manner, sights could be taken on the front of a roller from one side and on the back of the roller from the other side. Thus, position of ancillary equipment that might have affected prior art "sight" lines has no effect on the instant invention.

Figure 12:
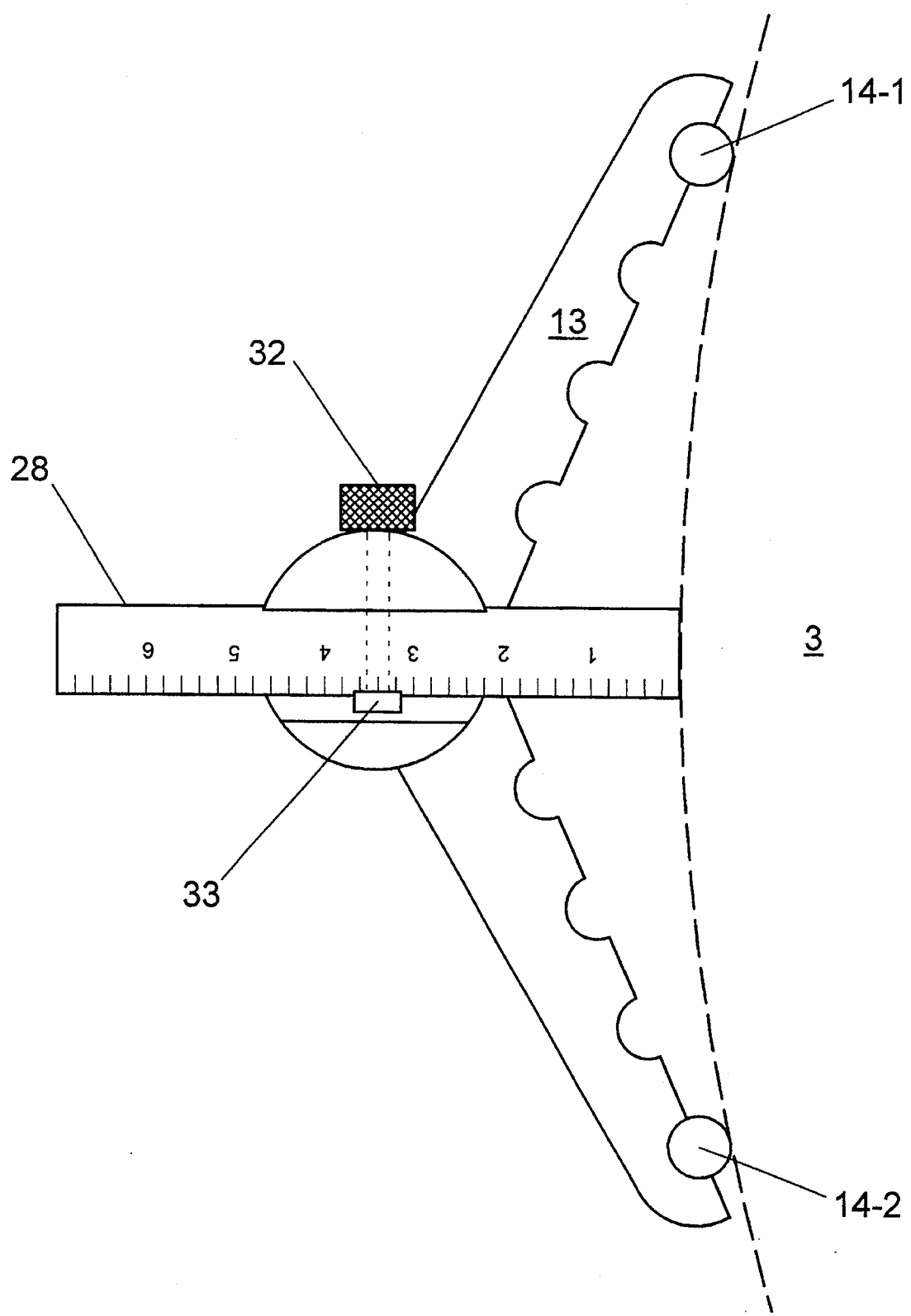
FIG. 12 shows a side view of a secondary function for the frame of the instant invention wherein the frame can be used as a simple scale support in the horizontal or vertical axis.
Figure 13:
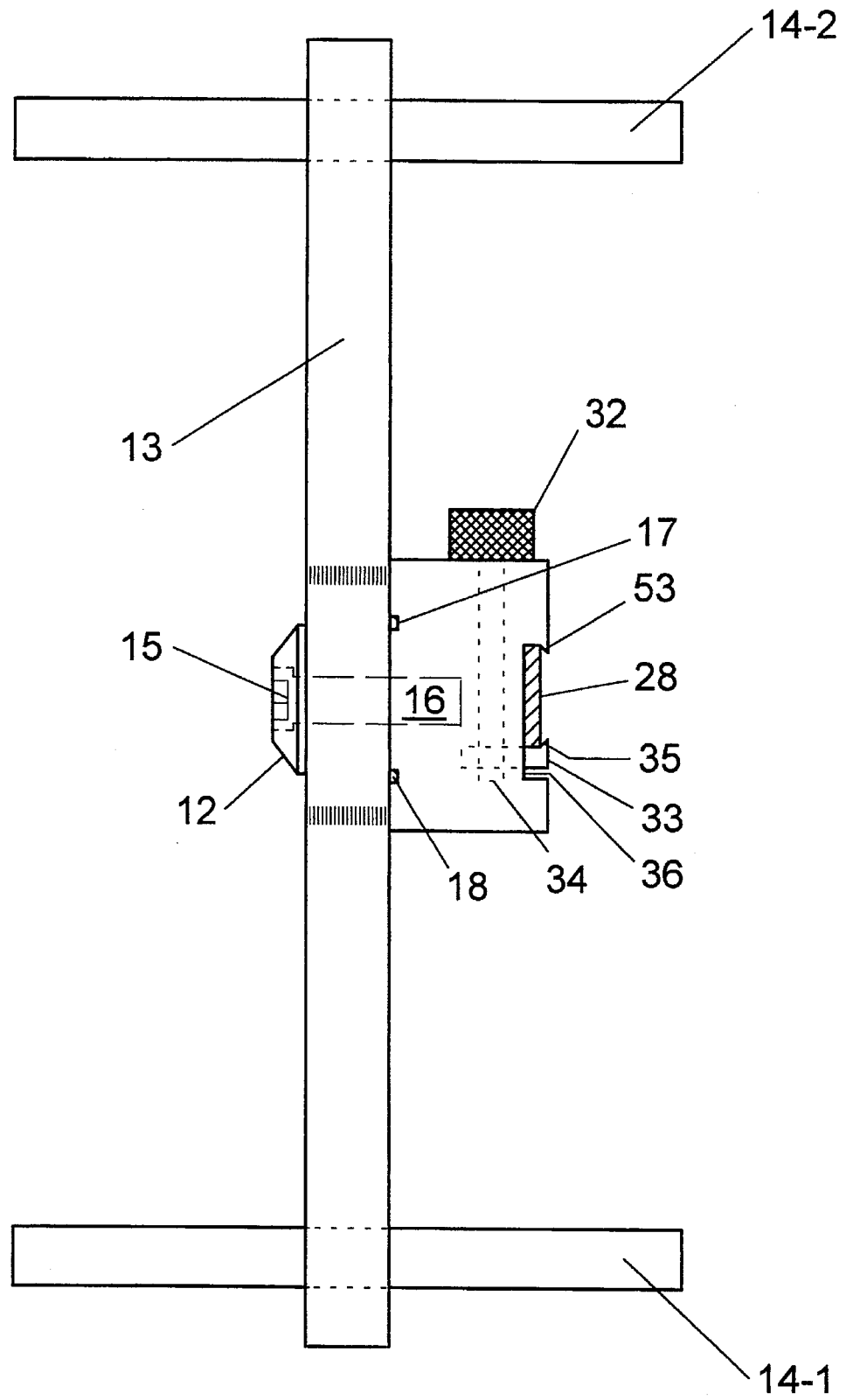
FIG. 13 shows a top view of the secondary function for the frame of the instant invention as illustrated in FIG. 12.

An alternate embodiment of the instant invention is shown in FIGS. 12 and 13. A scale groove, not numbered, has been machined within the rotatable head and a scale clamp has been added. The clamp has the same parts and operates in the same manner as previously described. The scale groove places the precision scale in the exact radial position to the complete tool but can only be used in pure vertical or horizontal measurement. Although this concept of pure vertical or pure horizontal moves away from the free axis use of the tool, it will be especially useful when a measurement must be taken in relationship directly to the face of the roller, shaft or other object. This measurement technique is often needed when one must consider the center line location by adding the object radius to the scale readings.

There has been disclosed heretofore in the above discussion the best embodiment and best mode of the present invention as presently contemplated and tested. It is to be understood that the examples given and the dimensions given may be changed. Slightly different methods of attachment of assemblies to each other to form the instant invention may be made. Slight changes in the use of the equipment may be made by varying the order in which the "sights" are made. Thus, modifications can be made to this invention without departing from the spirit of the invention and, if such modifications are so made, they should be construed as being within the spirit of the invention.

I claim:

1. A free axis alignment apparatus comprising:

(a) a v-flame including two arms and a block disposed at the vertex of said v-flame, each of said arms having a first end and a second end and further having a topside and an underside, each of said arms jointed at its first end to said block with said arms in angular relationship, said arms defining a plane;

(b) a rotatable head pivotally attached to said block of said v-frame such that said rotatable head is confined to rotation in a single plane fixed in relation to said plane defined by said arms of said v-flame;

(c) a horizontal target platform swivelably attached to said rotatable head; and (d) level means secured to said horizontal target platform for leveling thereof.

2. The free axis alignment apparatus of claim 1, further comprising a vertical target platform demountably secured to said horizontal target platform in perpendicular relationship thereto.

3. The free axis alignment apparatus of claim 1 wherein each of said arms has a longitudinal axis, wherein said v-frame defines a plane including said longitudinal axis of each of said arms and wherein the free axis alignment apparatus further comprises a plurality of stabilizer rods disposed in mutually parallel relationship along and connected to said underside of said arms of said v-frame with said stabilizer rods perpendicular to said plane.

4. The free axis alignment apparatus of claim 3 wherein the number of said stabilizer rods is an even number and wherein said stabilizer rods are evenly divided between said arms.

5. The free axis alignment apparatus of claim 3 wherein said arms and said block are integrally formed in one continuous piece.

6. The free axis alignment apparatus of claim 5 further comprising an extension arm having a first end and a second end, said first end thereof affixed to said rotatable head such that said extension arm lies parallel to said plane of said v-frame with said second end thereof swivelably attached to said horizontal platform.

7. The free axis alignment apparatus of claim 6 wherein said angular relationship between said arms is an obtuse angle between 120 and 160 degrees.

8. The free axis alignment apparatus of claim 6 further comprising stabilizer notches formed in said underside of said arms of said v-frame for engaging said stabilizer rods, said notches each having a lateral axis perpendicular to said plane defined by said v-frame.

9. The free axis alignment apparatus of claim 6 further comprising a vertical target platform demountably secured to said horizontal target platform in perpendicular relationship to said horizontal platform and in parallel relationship to said plane defined by said v-frame.

10. The free axis alignment apparatus of claim 6 wherein said leveling means comprises a precision bubble level.

11. A free axis alignment apparatus adapted to align a selected object with respect to its horizontal and vertical axis, comprising:

(a) a v-frame comprising two arms and a block, each of said arms having a first end a longitudinal axis and a second end and further having a topside and an underside, each of said first end of said arms joined to said block in obtuse angular relationship between 120 and 160 degrees, with said block at the apex of said v-frame, said arms and said block forming one integral piece, with said v-frame defining a plane including said longitudinal axis of each of said arms;

(b) a plurality of stabilizer notches formed within said underside of said arms of said v-frame for engaging stabilizer rods, said notches each having a lateral axis perpendicular to said plane defined by said v-frame (c) a plurality of stabilizer rods engaged within said stabilizer notches, in mutually parallel relationship, with said stabilizer rods perpendicular to said plane defined by said v-frame;

(d) a rotatable head pivotally attached to said block of said v-frame;

(e) a horizontal target platform swivelably attached to said rotatable head (f) level means secured to said horizontal target platform for leveling thereof.

12. The free axis alignment apparatus of claim 11 wherein the number of said stabilizer rods is an even number and wherein said stabilizer rods are evenly divided between said arms.

13. The free axis alignment apparatus of claim 11 further comprising a vertical target platform demountably secured to said horizontal target platform in perpendicular relationship thereto.

14. The free axis alignment apparatus of claim 11 further comprising an extension arm having a first end a second end, said first end thereof affixed to said rotatable head such that said extension arm lies parallel to said plane defined by said v-frame with said second end thereof swivelably attached to said horizontal platform.

15. The free axis alignment apparatus of claim 13 further comprising a vertical target platform demountably secured to said horizontal target platform in perpendicular relationship thereto.

16. The free axis alignment apparatus of claim 11 wherein said arms and said block are integrally formed as one continuous piece.

17. The free axis alignment apparatus of claim 11 wherein said rotatable head further has a front face and a back face, said front face positioned against said v-frame and said back face further comprises:

a scale groove formed in said back face; and, scale clamping means.

18. A method of using a free axis alignment apparatus, having a v-flame incorporating a rotatable head and further having a set of stabilizing rods, an extension arm, a horizontal platform, a precision level, and a target scale, for aligning an object having first and second ends with respect to its horizontal axis through the use of a survey instrument comprising the steps of:

(a) placing the target scale in the horizontal platform;

(b) placing the v-frame at the first end of the object to be aligned with respect to the horizontal;

(c) moving the v-frame about the object until the target scale may be sighted by the survey instrument;

(d) adjusting the horizontal platform about the rotatable head until the precision level shows that the horizontal platform is perfectly level;

(e) clamping the rotatable head to hold the adjustment of step (d);

(f) sighting the target scale to determine a first target scale value;

(g) placing the v-frame, without changing the rotatable head position, at the second end of the object to be aligned with respect to the horizontal;

(h) positioning the v-frame about the object to be aligned until the precision level shows that the horizontal platform is again perfectly level;

(i) sighting the target scale to determine a second target scale value;

(j) taking the difference, if any, between the two target scale values to determine horizontal alignment.

19. The method of use of claim 18 further comprising the additional step of placing a set of stabilizer rods on the v-frame, following step (a).

20. A method of using a free axis alignment apparatus, having a v-frame incorporating a rotatable head and further having a set of stabilizing rods, an extension arm, a horizontal platform, a vertical adapter platform, a precision level, and a target scale, for aligning an object having first and second ends with respect to its vertical axis comprising the steps of:

(a) placing the vertical adapter platform in the horizontal platform;

(b) placing the target scale in the vertical adapter platform;

(c) placing the v-frame at the first end of the object to be aligned with respect to the vertical;

(d) moving the v-frame about the object until the target scale may be sighted by the survey instrument;

(e) adjusting the horizontal platform about the rotatable head until the precision level shows that the horizontal platform is perfectly level;

(f) clamping the rotatable head to hold the adjustment of step (e);

(g) sighting the target scale to determine a first target scale value;

(h) placing the v-frame, without changing the rotatable head position, at the second end of the object to be aligned with respect to the vertical;

(i) positioning the v-frame about the object to be aligned until the precision level shows that the horizontal platform is again perfectly level;

(j) sighting the target scale to determine a second target scale value;

(k) taking the difference, if any, between the two target scale values to determine vertical alignment.

21. The method of use of claim 20 further comprising the additional step of placing a set of stabilizer rods on the v-frame, following step (a).

22. The method of use of claim 20 incorporating horizontal alignment by adding the following steps after step (k):

(l) removing the vertical adapter platform, without changing the rotatable head position, from the horizontal platform;

(m) placing the target scale in the horizontal platform;

(n) re-placing the v-frame at the second end of the object to be aligned;

(o) positioning the v-frame about the object to be aligned until the precision level shows that the horizontal platform is again perfectly level;

(p) sighting the target scale to determine a third target scale value;

(q) placing the v-frame, without changing the rotatable head position, at the first end of the object to be aligned with respect to the horizontal;

(r) positioning the v-frame about the object to be aligned until the precision level shows that the horizontal platform is again perfectly level;

(s) sighting the target scale to determine a fourth target scale value;

(t) taking the difference, if any, between the third and fourth target scale values to determine horizontal alignment.

* * * * *